United States Patent [19]
Bradley

[11] Patent Number: 5,710,835
[45] Date of Patent: Jan. 20, 1998

[54] STORAGE AND RETRIEVAL OF LARGE DIGITAL IMAGES

[75] Inventor: Jonathan N. Bradley, Los Alamos, N. Mex.

[73] Assignee: The Regents of the University of California, Office of Technology Transfer, Alameda, Calif.

[21] Appl. No.: 557,475

[22] Filed: Nov. 14, 1995

[51] Int. Cl.$^6$ .............................. G06K 9/42; G06K 9/36
[52] U.S. Cl. ..................... 382/233; 382/298; 348/399
[58] Field of Search ............................ 382/232, 240, 382/260, 261, 263, 264, 278, 298, 276, 282; 348/397, 398, 403, 411; 364/572

[56] References Cited

U.S. PATENT DOCUMENTS

| | | | |
|---|---|---|---|
| 4,692,806 | 9/1987 | Anderson et al. | 348/399 |
| 4,718,104 | 1/1988 | Anderson | 382/41 |
| 5,101,446 | 3/1992 | Resnikoff et al. | 382/56 |
| 5,177,796 | 1/1993 | Feig et al. | 382/56 |
| 5,187,755 | 2/1993 | Aragaki | 382/56 |
| 5,204,916 | 4/1993 | Hamilton et al. | 382/296 |
| 5,212,742 | 5/1993 | Normile et al. | 382/56 |
| 5,262,958 | 11/1993 | Chui et al. | 364/487 |
| 5,315,670 | 5/1994 | Shapiro | 382/233 |
| 5,325,449 | 6/1994 | Burt | 382/240 |
| 5,353,060 | 10/1994 | Keesen et al. | 348/408 |

OTHER PUBLICATIONS

J. N. Bradley et al., "The Wavelet/Scalar Quantization Compression Standard for Digital Fingerprint Images," LA-UR-94-0827, Los Alamos National Laboratory (1994).
"WSQ Gray-scale Fingerprint Image Compression Specification," CJIS FBI, IAFIS-IC-010v2 (1993).

*Primary Examiner*—Dwayne Bost
*Assistant Examiner*—Brian L. Johnson
*Attorney, Agent, or Firm*—Ray G. Wilson

[57] ABSTRACT

Image compression and viewing are implemented with (1) a method for performing DWT-based compression on a large digital image with a computer system possessing a two-level system of memory and (2) a method for selectively viewing areas of the image from its compressed representation at multiple resolutions and, if desired, in a client-server environment. The compression of a large digital image I(x,y) is accomplished by first defining a plurality of discrete tile image data subsets $T_{ij}(x,y)$ that, upon superposition, form the complete set of image data I(x,y). A seamless wavelet-based compression process is effected on I(x,y) that is comprised of successively inputting the tiles $T_{ij}(x,y)$ in a selected sequence to a DWT routine, and storing the resulting DWT coefficients in a first primary memory. These coefficients are periodically compressed and transferred to a secondary memory to maintain sufficient memory in the primary memory for data processing. The sequence of DWT operations on the tiles $T_{ij}(x,y)$ effectively calculates a seamless DWT of I(x,y). Data retrieval consists of specifying a resolution and a region of I(x,y) for display. The subset of stored DWT coefficients corresponding to each requested scene is determined and then decompressed for input to an inverse DWT, the output of which forms the image display. The repeated process whereby image views are specified may take the form an interaction with a computer pointing device on an image display from a previous retrieval.

28 Claims, 6 Drawing Sheets

Microfiche Appendix Included
(3 Microfiche, 319 Pages)

STORAGE AND RETRIEVAL OF LARGE DIGITAL IMAGES

This invention relates to digital imaging and, more particularly, to the storage and retrieval of data contained in very large digital images. This invention was made with government support under Contract No. W-7405-ENG-36 awarded by the U.S. Department of Energy. The government has certain rights in the invention.

BACKGROUND OF THE INVENTION

A microfiche appendix containing 1 microfiche card with a total of 183 frames is attached hereto. The program listing set out in the microfiche contains material that is subject to copyright protection. The copyright owner has no objection to the facsimile reproduction by anyone of the patent document or the patent disclosure, as it appears in the patent and Trademark Office patent file or records, but otherwise reserves all copyright rights whatsoever.

Many applications exist that require the storage and retrieval of very large digital images. Examples of such data sets include a Landsat Thematic Mapper (TM) scene, a mosaic of digital orthophotos (digitized aerial photographs), or a high resolution scan of a photographic negative. As used herein, the term "image" means any large two-dimensional array of numeric data even if that data may not typically be referred to as an "image," e.g., digital elevation data.

Due to the prodigious amounts of data present in such images, data compression is of significant importance to improve the utilization of computer storage and transmission resources. The image dimensions under consideration are significantly larger than can be viewed on a computer monitor. If a user can only view image subsections at full resolution, a display may contain less than one percent of the image. Under such circumstance, it is difficult to form in the viewer an overall picture of the image or to locate particular features of interest. Viewing the image at less than full resolution permits larger regions of the image to be displayed or even an entire image.

Certain computer-implemented image data compression schemes used in the prior art are subband coding techniques, discussed in more detail below. The image data is separated into a number of subimages that are referred to as "subbands" since each contains information from a different band of spatial frequencies in the image. Compressing the subbands separately facilitates matching the overall compression algorithm to the image statistics. A recent mathematical development, the discrete wavelet transform (DWT), has significant theoretical overlap with the methods developed for generating the image subbands. For this reason, the term "subband decomposition" has come to be synonymous with a DWT. This terminology is used here.

For very large image dimensions complications arise in the computation of the DWT. The prior art discusses techniques for implementing the DWT where it is implied that the entire image data array is stored in computer main memory and that the computer-processed algorithm can readily access all of the image pixels. For very large images the memory involved in performing a DWT can become prohibitive. For example, consider an image that is of dimension 50,000×50,000 pixels, i.e., consisting of 2.5 billion pixels. If the transform is implemented in 32-bit precision floating point arithmetic then 10 gigabytes of computer memory are required (not including work space). Clearly, some method is required for paging data from computer memory and computing the DWT in sections.

Although one could divide the image array into rectangular subsections and perform a DWT on each of these independently, this would be undesirable for two reasons. First, there would be wavelet transform boundary conditions in the interior of the image data which could potentially result in compression artifacts. Furthermore, the implementation of a local multiscale retrieval routine is complicated by these interior boundaries.

In accordance with the present invention, a method is provided for the seamless wavelet-based compression of very large contiguous images and for accessing arbitrary locations in the image at a variety of resolutions.

Accordingly, it is an object of the present invention to provide for retrieving from the compressed representation an image subsection from any location within the image with dimensions that are suitable for display.

It is another object of the present invention to permit a user to interactively specify image regions for display and rapidly retrieve the image regions.

Yet another object of the present invention is to permit the user to navigate, or "browse," over the database forming the image.

One other object of the present invention is to provide for recalling the image at a variety of resolutions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, this invention may comprise (1) a method for performing DWT-based compression on a large digital image with a computer system possessing a two-level system of memory and (2) a method for selectively viewing areas of the image from its compressed representation at multiple resolutions and, if desired, in a client-server environment. The two-level memory system refers to primary and secondary memories. The primary memory is typically much smaller than the secondary memory but is more accessible by the processor.

The compression of a large digital image $I(x,y)$ is accomplished by first defining a plurality of discrete tile image data subsets $T_{ij}(x,y)$ that, upon superposition, form the complete set of image data $I(x,y)$. A seamless wavelet-based compression process is effected on $I(x,y)$ that is comprised of successively inputting the tiles $T_{ij}(x,y)$ in a selected sequence to a DWT routine, adding corrections that are passed from previous invocations of the DWT routine on other $T_{ij}(x,y)$, and storing the resulting DWT coefficients in a first primary memory. These coefficients are periodically compressed and transferred to a secondary memory to maintain sufficient memory in the primary memory for data processing. In the absence of the compression step, the sequence of DWT operations on the tiles $T_{ij}(x,y)$ effectively calculates a seamless DWT of $I(x,y)$ that can be viewed as an "overlap-add" realization of the DWT. The seamless DWT process transforms $I(x,y)$ to a set of DWT coefficients to form a set of subbands that embody a hierarchical representation of low-resolution representations of the image data array $I(x,y)$.

Data retrieval consists of specifying a resolution and a region of I(x,y) for display. The subset of stored DWT coefficients corresponding to each requested scene is determined and then decompressed for input to an inverse DWT, the output of which forms the image display. The repeated process whereby image views are specified may take the form an interaction with a computer pointing device on an image display from a previous retrieval.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
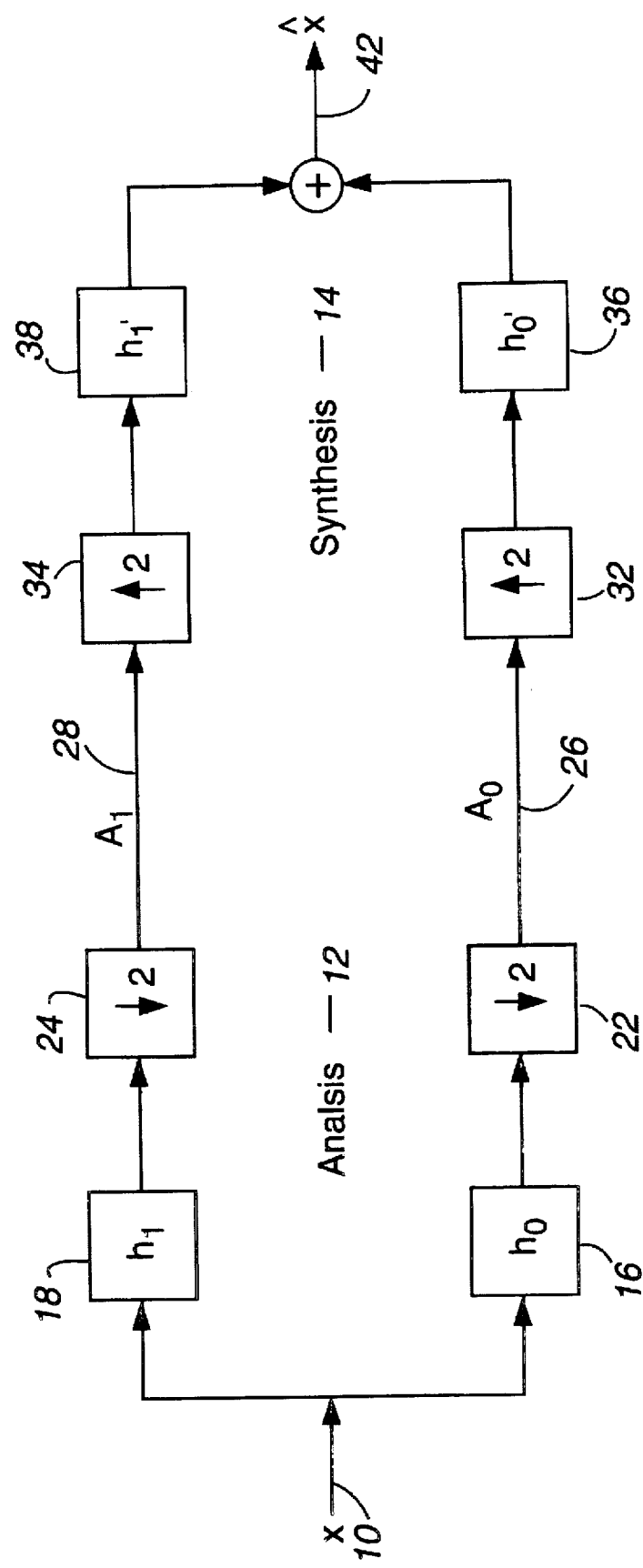
FIG. 1 is a schematic diagram of a prior art two-channel forward (analysis) and inverse (synthesis) discrete wavelet transformation (DWT) of an input data array.

The present invention is concerned in part with a computer-implemented subband compression scheme for large images. The advantageous use of a two-level system of computer memory provides for the efficient local computation of the DWT in conjunction with a spatially adaptive coding scheme, allowing seamless image compression with minimal memory requirements. Furthermore, the invention provides for rapidly retrieving image views of arbitrary dimension and location at a variety of resolutions from the compressed data.

The invention advantageously uses the DWT for two purposes. The DWT is used as a preprocessing step in a computer to facilitate data compression. The subdivision of the input image data array into a set of image subbands that are coded separately facilitates matching the compression algorithm to the image statistics. Moreover, the DWT is also used to provide for multiscale data retrieval. Due to the multiresolution nature of the DWT, a description of the image at a variety of resolutions is inherent in the DWT decomposition, thus facilitating multiscale retrieval of the compressed data in accordance with the present invention.

DEFINITIONS columns: Samples per line in an image.

compressed data: Either compressed image data or table specification data or both.

compression: Reduction in the number of bits used to represent source image data.

(digital) image: A two-dimensional array of data.

downsampling: A procedure by which the spatial resolution of an image is reduced.

DWT: (discrete wavelet transform) A linear transformation, implemented by a multirate filter bank, that maps a digital input signal to a collection of output subbands.

Huffman coding: An entropy coding procedure that assigns a variable length code to each input symbol.

Huffman table: The set of variable length codes required in a Huffman coder.

image data: Either source image data or reconstructed image data.

lossless: A descriptive term for encoding and decoding processes and procedures in which the output of the decoding procedures(s) is identical to the input to the encoding procedure(s).

RGB images: A "red-green-blue" image, i.e., a digital image that is stored as three monochromatic images, each of which represents one of the three primary color components.

quantization table: The set of quantization values (i.e., bin widths) used to quantize DWT coefficients within the subbands.

quantize: The act of performing the quantization procedure for a DWT coefficient.

sample: One element in the two-dimensional array that comprises an image.

upsampling: A procedure by which the spatial resolution of an image is increased.

PRIOR ART SUBBAND CODING

The first stage in a computer implementation of a DWT-based lossy image compression algorithm entails a DWT decomposition of the input image. In the case of multispectral imagery (which includes RGB images), an interspectral transform may be applied at this stage immediately before or after the DWT. Following the image transformation, the DWT coefficients are quantized. This is the lossy portion of the algorithm and maps the DWT coefficients into a stream of quantizer indices. Finally, the stream of quantizer indices are compressed with a lossless technique. Image decompression is achieved by inverting the lossless compression, decoding the quantizer symbols, and then performing an inverse DWT. A discussion of the use of the DWT in image compression can be found in J. N. Bradley et al., "The Wavelet-Scalar Quantization Compression Standard for Digital Fingerprint Images," Proc. of IEEE International Symposium on circuits and Systems, May 31–Jun. 2, 1994.

FIG. 1 is a flow diagram of a computer processor implementation for a one-dimensional forward (analysis) and inverse (synthesis) DWT and forms a basic building block in the two-dimensional DWT implementation used in the invention. The input to the analysis section is the discrete-time signal x10 to analysis section 12 and synthesis section 14 The discrete-time sequences $A_0$ 26 and $A_1$ 28 are the output subband signals from the analysis section and form the input to synthesis section 14. The systems $h_0$ 16 and $h_1$ 18 form a lowpass-highpass finite impulse response (FIR) filter pair that separates the low and high frequency components of x10. The systems 22 and 24 denoted by ↓2 are "downsamplers" that discard every second sample in the filter outputs. The analysis system is said to be "critically sampled", i.e., data is output from the system at the same rate as it is input. Due to the downsampling operations 22 and 24, $A_0$ 26 and $A_1$ 28 are full band signals that embody, respectively, the low and high frequency information in x10.

The process shown in FIG. 1 also inputs the subband signals $A_0$ 26 and $A_1$ 28 to a synthesis section 14 that synthesizes the signal x̂ 42. The systems $h_0'$ 36 and $h_1'$ 38 form another lowpass-highpass FIR filter pair and the systems 32 and 34 denoted by ↑2 are "upsamplers" that increase the signal sampling rate by inserting a zero between samples. If the four digital filters, $h_0$ 16 and $h_1$ 18, and $h_0'$ 36 and $h_1'$ 38, shown in FIG. 1 are chosen appropriately, x̂

42 is equal to x10, i.e. synthesis section 14 shown in FIG. 1 inverts the operation performed by analysis section 12.

Figure 2:
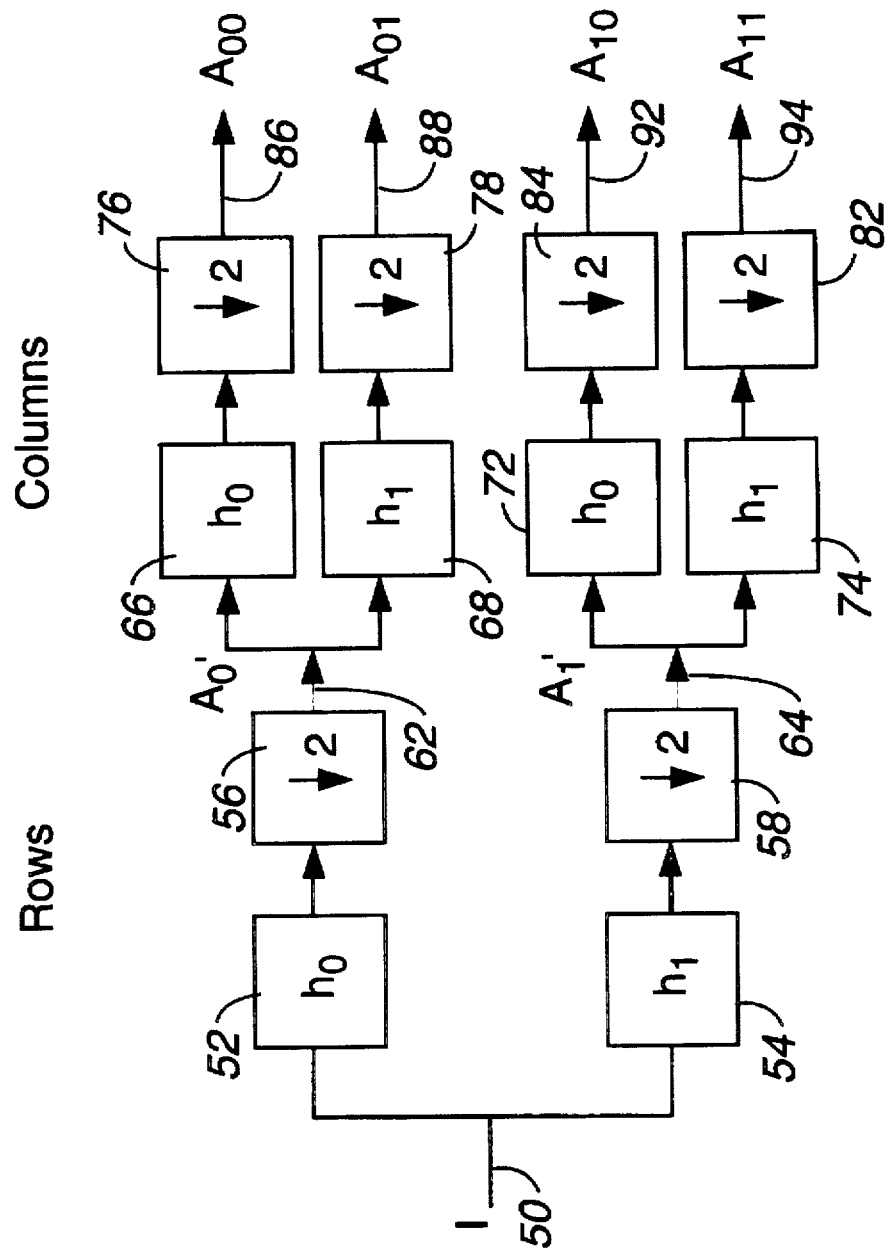
FIG. 2 is a schematic diagram of a two dimensional DWT process realized with multiple applications of the analysis portion of the system shown in FIG. 1.

Separable realizations are often used for the two-dimensional DWT analysis and synthesis procedures, i.e., implementations where the corresponding one-dimensional procedure shown in FIG. 1 is applied separately to each image row and column. FIG. 2 depicts a separable two-dimensional forward DWT. The analysis system of FIG. 1 is first applied to each row of image I 50 through FIR filter pair $h_0$ 52 and $h_1$ 54, with downsamplers 56 and 58 to split each row into a lowpass and highpass subband. The lowpass subband from each image row is written as a row into the temporary array $A_0'$ 62. Similarly, the highpass subband of each row is written as a row in the temporary array $A_1'$ 64.

The columns in each temporary array are then each processed with a one-dimensional DWT of FIG. 1. The lowpass subband array $A_0'$ is processed through FIR filter pair $h_0$ 66 and $h_1$ 68, with downsamplers 76 and 78 to further split each column into lowpass-lowpass and lowpass-highpass subbands. The highpass subband array $A_1'$ is processed through FIR filter pair $h_0$ 72 and $h_1$ 74, with downsamplers 82 and 84 to further split each column into highpass-lowpass and highpass-highpass subbands.

Figure 3:
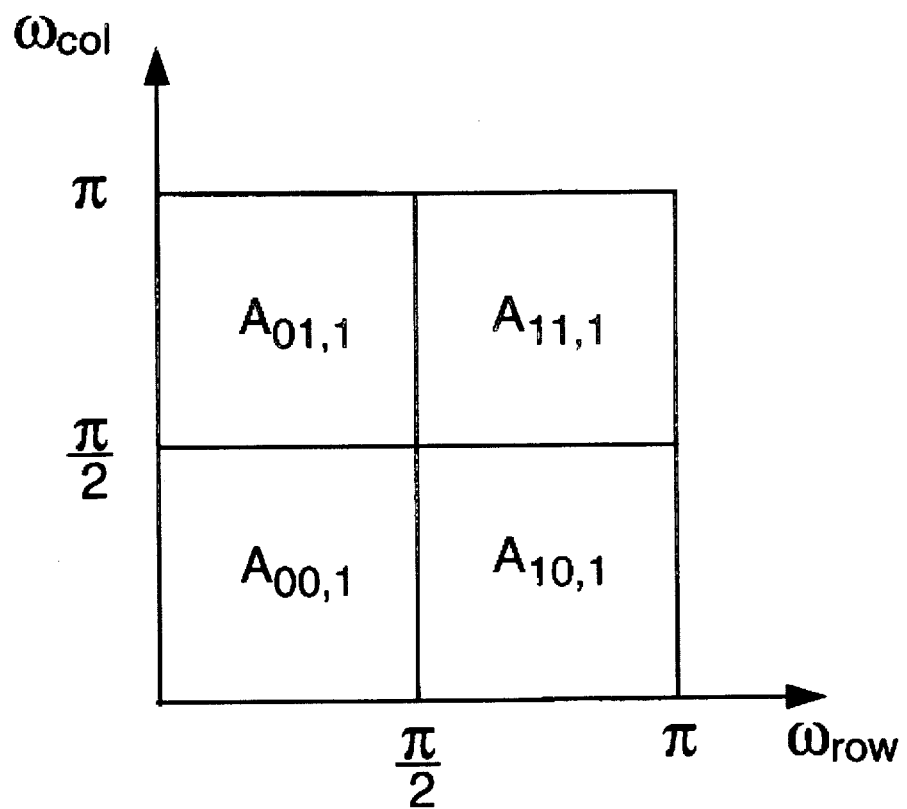
FIG. 3 illustrates the four subbands formed from an image array by application of the DWT shown in FIG. 2.

This basic system shown in FIG. 2 thus splits the input image $I=A_{00,0}$ into four subbands, $A_{00,1}$ 86, $A_{01,1}$ 88, $A_{10,1}$ 92, $A_{11,1}$ 94, with appropriate frequency supports as illustrated in FIG. 3. In this $A_{ij,k}$ subband notation, the i and j subscripts denote the filter path that was used in their creation. The first subscript refers to the row operation and the second to the column operation with a "0" indicating a lowpass operation and "1" a highpass operation. For example, subband $A_{10}$ 92 is created by a highpass filtering on the image rows followed by lowpass filtering on the columns of $A_1'$ 64. The image is resolved into four subbands that contain different frequency components of the original image, from which the original image can be synthesized, as discussed for FIG. 1.

Figure 4:
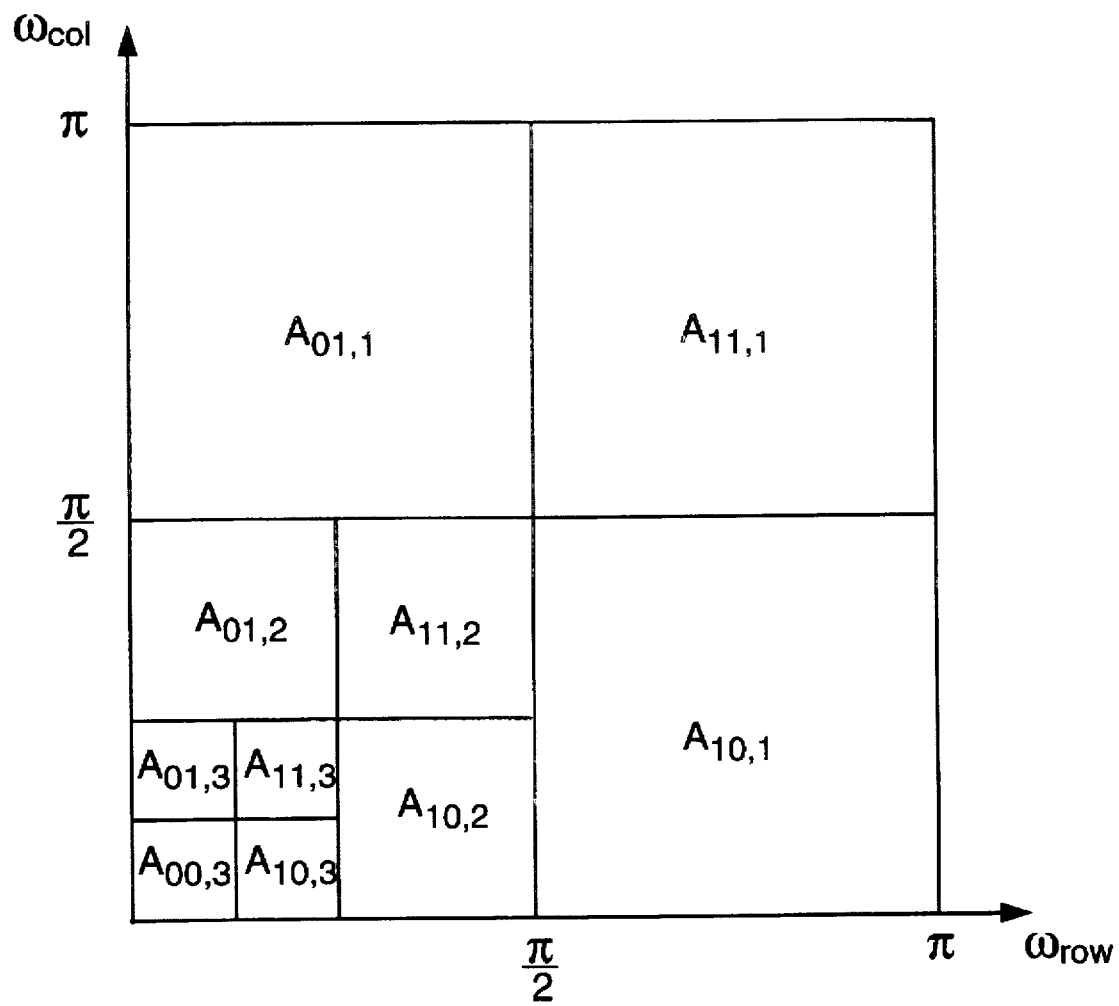
FIG. 4 illustrates the frequency support of a subband decomposition resulting from repeated applications of the system shown in FIG. 3.

Finer frequency partitions are produced by cascading the system of FIG. 2. Typically, the lowpass-lowpass subband is repeatedly output to this same process, resulting in an "octave-scaled" decomposition. FIG. 4 illustrates the frequency support of a subband decomposition resulting from three cascades. The third subscript in the subband notation denotes the level of recursion in the decomposition. Let L denote the number of levels in the cascade. Note the $A_{00,s}$ for $1 \leq s < L$ exist at intermediate stages of the process.

It is sometimes convenient to express the octave-scaled DWT of I(x,y), i.e., the collection of subbands $A_{ij,k}(u,v)$ as $\hat{I}(s,u,v)$, where s denotes a one dimensional ordering of the subbands. For example, in the subband notation shown in FIG. 4, s=i+2j+3(L−k), and $\hat{I}(0,u,v)$, $\hat{I}(1,u,v)=A_{0,1,L}(u,v)$, ..., $\hat{I}(3L,u,v)=A_{11,1}(u,v)$.

The input to the one-dimensional DWT depicted in FIG. 1 is assumed to be of infinite duration. Effecting the DWT on a finite length signal, e.g., an image row or column, necessitates the definition of transform boundary conditions. The boundary conditions define a signal extension, i.e., a definition of the signal outside of its domain. A boundary condition that is commonly used is the periodic extension in which the finite length signal is viewed as one period of an infinite periodic waveform. Another example is zero boundary conditions in which the signal is viewed as padded with zeros. Yet another example is reflected boundary conditions where the signal is extended by performing a mirror image of the data.

SUBBAND DECOMPOSITION OF LARGE IMAGES

The invention consists of two main procedures: a compression routine and a decompression (browsing) routine. The compression routine proceeds in a similar fashion as WSQ compression with the advantageous use of a two-level system of memory to accommodate the large image dimensions. In accordance with one aspect of the invention, the image is subdivided into a number of tiles, each of which is processed by a DWT routine. The DWT routine uses tile-dependent boundary conditions and data transfers with invocations of the DWT routine on other image tiles to effectively produce the same output as the DWT routine would output if applied to the entire image while providing a more advantageous usage of both primary and secondary memory. The process can be viewed as an overlap-add implementation of the DWT. The preferred implementation of the invention is based on the four-channel separable DWT of FIG. 2. Clearly, non-separable and M-channel filter banks are also applicable.

The Compression Routine

Figure 5:
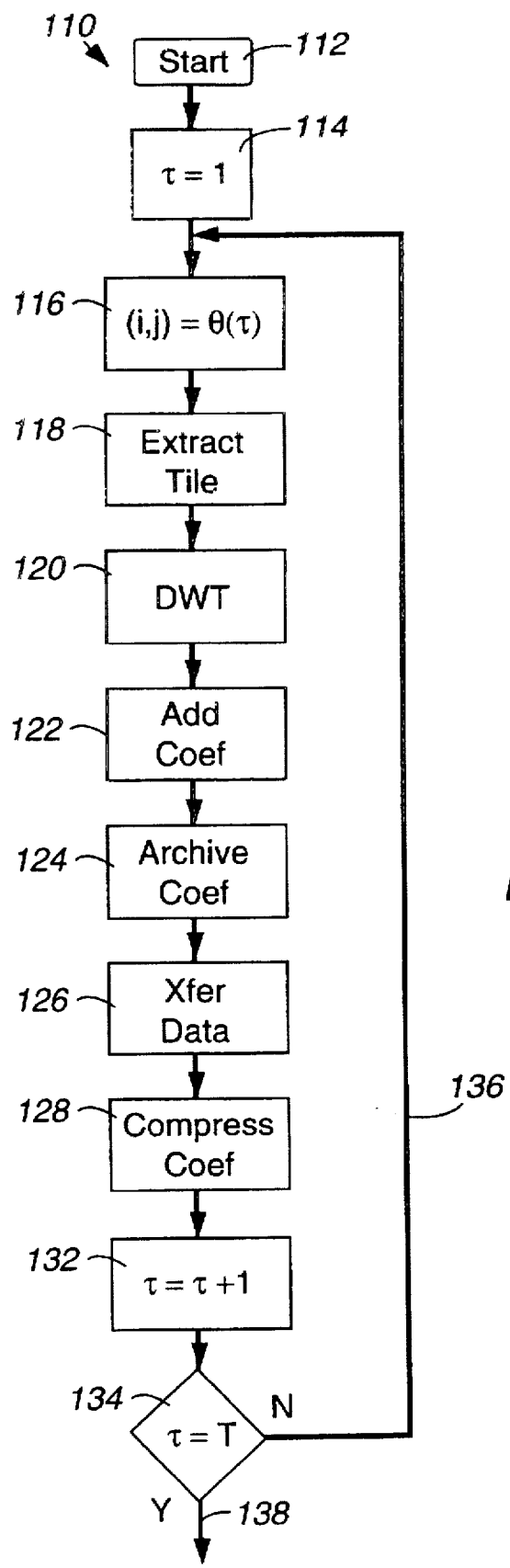
FIG. 5 is a flow diagram for DWT data compression according to one embodiment of the present invention.

Referring now to FIG. 5, the compression routine outputs the compressed data in a compressed image data (CID) file which is structured for rapid local multiscale retrieval. The image data is assumed to exist on secondary memory, e.g., a computer hard drive memory, and may be contained in a single file or as a mosaic of subimages with each subimage contained in a separate file. The image data is denoted by I(x,y), where x and y are integers such that $0 \leq x < W_i$ and $0 \leq y < H_i$. The tile images are of the same dimensions as I(x,y) but have support restricted to a $W_t \times H_t$ subset of the (x,y) coordinates. More specifically, $$T_{ij}(x,y) = \begin{cases} I(x,y), (x,y) \in \text{supp}[T_{ij}(x,y)] \\ 0, \text{otherwise} \end{cases}$$

where $\text{supp}[T_{ij}(x,y)] = \{(x,y) | t_{00,ij} \leq x \leq t_{01,ij}, t_{10,ij} \leq y \leq t_{11,ij}\}$ and where the four corners of a tile are given by $t_{00,ij} = iW_t$
$t_{01,ij} = \min((i+1)W_t-1, W_{i-1})$
$t_{10,ij} = jH_t$
$t_{11,ij} = \min((j+1)H_t-1, H_{i-1})$.

The number of tile images is given by $$T = \left\lceil \frac{W_i}{W_t} \right\rceil \left\lceil \frac{H_i}{H_t} \right\rceil$$

There are no restrictions on the image dimensions and it is not necessary that $W_i$ be divisible by $W_t$ or that $H_i$ be divisible by $H_t$. The tile images for $i = \lceil W_i/W_t \rceil - 1$ and $j = \lceil H_i/H_t \rceil - 1$ are allowed to have support regions smaller than $W_t \times H_t$. The present invention recognizes that I(x,y) can be represented as a superposition of the tiles, where $$I(x,y) = \sum_i \sum_j T_{ij}(x,y) \qquad (1)$$

and since the DWT is a linear transformation, the DWT of I(x,y) can be obtained by summing the DWT's of the $T_{ij}(x,y)$, i.e., $$\hat{I}(s,u,v) = \sum_i \sum_j \hat{T}_{ij}(s,u,v), \qquad (1a)$$

where s is defined above. As will be described below, performing a DWT separately on the tile images allows for a DWT-based compression to occur on the image with minimal memory requirements.

The $T_{ij}$ are processed sequentially in the compression routine. This requires a one-dimensional ordering of the $T_{ij}$ that is denoted by $\theta(\tau) = (i,j)$. (That is, the τth image tile to be wavelet transformed is $T_{\theta(\tau)}$.) The sum in Eqn. (1a) is not evaluated following the computation of all $\hat{T}_{ij}(s,u,v)$. Rather, this sum is updated after each $\tau$ iteration as $$\hat{I}_\tau(s,u,v) = \sum_{t=1}^{\tau} \hat{T}_{\theta(t)}(s,u,v). \quad (2)$$

After a given $\hat{T}_{\theta(\tau)}(s,u,v)$ has been calculated, this update involves only those $(s,u,v) \in \text{supp}[\hat{T}_{\theta(\tau)}(s,u,v)]$. (Note that since $h_0$ and $h_1$ are FIR that the $\hat{T}_{ij}$ have finite support). In the compression routine, the result from Eqn. (1a) is never stored in its entirety. Periodically, some or all of the DWT coefficients are compressed and written to secondary memory. Those coefficients eligible for compression are $$\{\hat{T}_{\theta(\tau)}(s,u,v) | \hat{T}_{\theta(\tau)}(s,u,v) = \hat{I}(s,u,v)\}. \quad (3)$$

By sequentially effecting a DWT on each image tile and updating the sum in Eqn. (2), a DWT-compression of the entire image can be effected with an efficient use of primary memory.

The compression routine is parameterized by $W_i$, $H_i$, $W_t$, and $H_t$ as well as the number of levels L in the subband decomposition; a bit-rate parameter R that specifies the compression ratio; and the analysis filters $h_0$ and $h_1$. A flow chart of the compression process is depicted in FIG. 5. The routine 110 is started 112 with $\tau=1$ and consists of a loop 136 indexed by $\tau$ that iterates on the $T_{ij}$. The first routine encountered in the loop is Extract Tile 118, which reads the pixel values contained in $\text{supp}[T_{ij}]$ from the image data and stores them in primary memory. The image tile is stored in a data structure that contains a description of its support as well as a pointer to the pixel values.

Subroutine DWT 120 (Discrete Wavelet Transform) is then invoked. In practice the DWT of each $T_{ij}$ is not effected by operating on the zero-padded $W_i \times H_i$ array. It is only necessary to provide memory for those values of $T_{ij}(x,y)$ where $(x,y) \in \text{supp}[T_{ij}(x,y)]$. The one-dimensional DWT routine operates on the rows and columns of the tile data array with appropriate boundary conditions. The boundary conditions employed in the various calls to the one-dimensional DWT routine are dependent upon the location of tile $T_{ij}$ in I. Reflected boundary conditions are used if the corresponding boundary of $T_{ij}$ coincides with a boundary of I, otherwise zero boundary conditions are used. Note that DWT 120 effects an expansive transform, that is, the number of non-zero coefficients emanating from the routine is generally greater than the number of pixels that are input to it.

Subroutine Add Coefficient 122 is invoked to retrieve the data transfers for $\hat{T}_{i-1,j}$ and $\hat{T}_{i,j-1}$ that were stored on primary or secondary memory by an invocation of subroutine Xfer Data 126 (see below) for an earlier iteration of $\tau$, and then adds them to $\hat{T}_{i,j}$, effectively performing the update in Eqn. (2). Note that this process implies a restriction on $\theta$. Clearly, processing on $T_{ij}(x,y)$ cannot proceed if it has not already occurred on tiles $T_{i-1,j}(x,y)$ and $T_{i,j-1}(x,y)$.

Subroutine Archive Coefficient 124 is then invoked, which stores in primary memory those wavelet coefficients in Eqn. (3) that were not stored earlier in a coefficient archive. Subroutine Xfer Data 126 stores the data that is recalled in later calls to Add Coef. 122. Two data segments are stored: those that are used when Add Coef. 122 is called for $T_{i,j+1}$ $$\{\hat{T}_{ij}(u,v) | (u,v) \in \text{supp}[\hat{T}_{ij}] \cup \text{supp}[\hat{T}_{i+1,j}]\}$$

and those that are used when Add Coef. 122 is called for $T_{i+1,j}$ $$\{\hat{T}_{ij}(u,v) | (u,v) \in \text{supp}[\hat{T}_{ij}] \cap \text{supp}[\hat{T}_{i+1,j}] - \text{supp}\hat{T}_{i+1,j}\}.$$

The data transfers are accomplished via temporary storage on either primary or secondary memory. Note that it is assumed that $$\text{supp}[\hat{T}_{ij}] \cap \text{supp}[\hat{T}_{i+2,j}] = \phi$$

and $$\text{supp}[\hat{T}_{ij}] \cap \text{supp}[\hat{T}_{i,j+2}] = \phi$$

for all i and j.

Periodically, in subroutine Compress Coefficient 128, some or all of the DWT coefficients in archive are compressed and written to secondary memory, i.e., they are dumped. Thus, the compression routine proceeds with primary memory continuously being allocated in Archive Coef. 124 and freed in Compress Coef. 128. The $\tau$ index is then indexed 132 to $\tau+1$ and the loop is repeated 136 until $\tau = T$ 138., i.e., the number of tiles, and the routine is terminated 138.

In the preferred implementation of the invention, the compression includes scalar quantization followed by zero-run length and Huffman coding of the quantizer indices. (Other quantization strategies and lossless coding procedures are clearly applicable at this point.) The scalar quantization requires that a bit allocation be performed that selects a bin-width for each subband based on local image statistics. For a given dump it is preferred that all subband statistics correspond to roughly the same region in I. Although a particular dump may not involve compression of coefficients from all subbands, statistics from all subbands will be utilized in performing an overall bit allocation. The result is a spatially adaptive image compression scheme with the scalar quantizer bin widths and the Huffman codeword lengths a function of spatial location on the image. The number of invocations of DWT 120 between dumps is subband dependent. On each coefficient dump a single Huffman table is generated for each subband that is output.

A two-level hierarchy of coefficient blocking is used in the compression process. The first level is necessitated by the fact that the wavelet coefficient archive must be periodically purged (Compress Coef 128), whereupon a rectangular subsection of a subband (i.e., a block) is coded. Moreover, before a dump occurs, each subband block that is output is blocked further into smaller subblocks. The second level of blocking is to provide for fast access to an arbitrary section of the CID file during image browsing. Upon output in secondary memory, the larger block is referred to as a Huffman block and has header information that describes the Huffman table, the quantizer characteristic, the block support, and an offset table describing the relative offset in the compressed data record of each subblock. The smaller block is referred to as a Huffman subblock. Each Huffman subblock within a particular Huffman block is typically compressed with the same quantizer characteristic and Huffman table. The CID file has an offset table that describes the offset of each compressed Huffman block.

The Browse Routine

Figure 6:
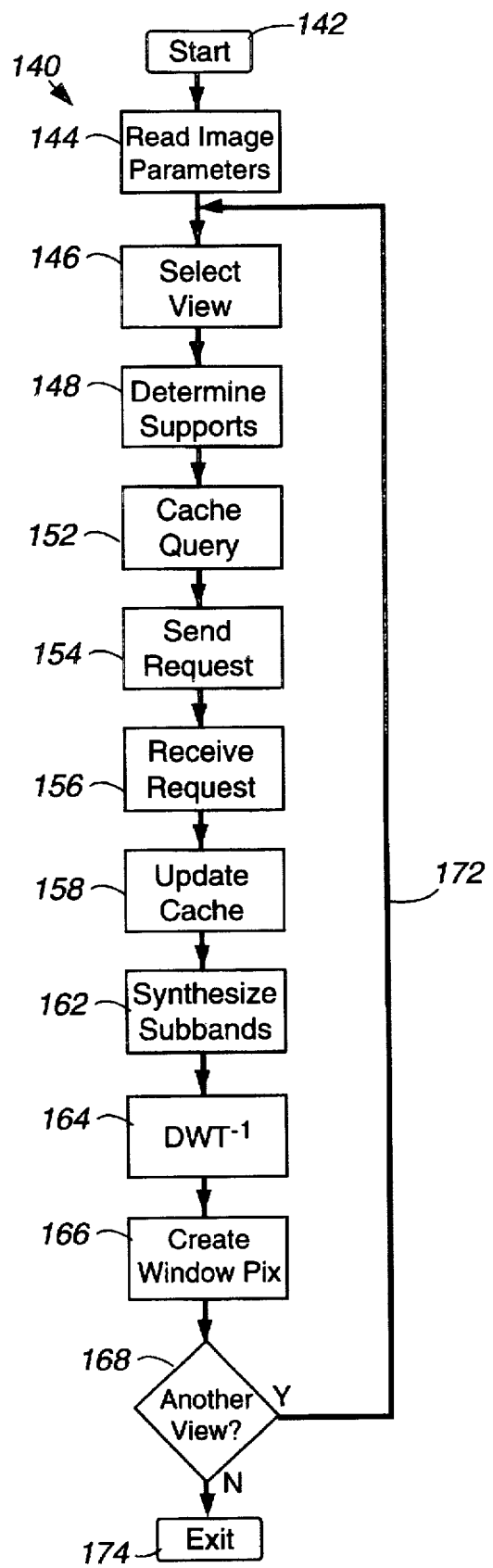
FIG. 6 is a flow diagram for decompressing data according to one embodiment of the present invention.

The browse routine 140 shown in flow diagram form in FIG. 6 accesses the CID computer memory file generated by compression routine 110 shown in FIG. 5 and generates pixel values for a sequence of window displays. The procedure has the capability for operating in a distributed environment, i.e., where the data is to be decompressed on a different computing platform than where the CID file resides. The client computer sends requests to the server computer that in turn transmits compressed data necessary for synthesizing a monitor window display. The client computer performs the operation of decompressing the received data and creating the computer monitor display. The routine on the client computer side provides for the management of a cache memory that contains data from previous accesses to the CID file. Any requested data contained in the cache may be retrieved from cache memory instead of from the server computer. The caching scheme is advantageous when an application is limited by transmission bandwidth and is not typically used when the decompression executable file and the CID file reside on the same platform.

Since the subbands $A_{00,s}$ for $0 \leq s \leq L$ are obtained by repeated applications of lowpass filtering and two-fold downsampling, they form low resolution representations of the original image data. Browse routine 140 exploits this multiscale property of the subband decomposition. When specifying a view, the user is restricted to selecting a resolution that is a power-of-two times the original image resolution. The display generation then involves the synthesis of the appropriate subsection of $A_{00,s}$ from the CID file. Thus, browse routine 140 extracts a relatively small subset of the wavelet coefficients that is then input to an (L-s)-level inverse DWT.

A request for data from subband $A_{ij,s}(x,y)$ is described by the set of (x,y) coordinates defining the subregion to be extracted. This set is denoted by $a_{ij,s}$ where $a_{ij,s} = \{(x,y) | x_{ij,s,0} \leq x \leq x_{ij,s,1}, y_{ij,s,0} \leq y \leq y_{ij,s,1}\}$.

Note that since the window is assumed to be rectangular the $a_{ij,s}$ are rectangular also. Recall that a view at scale s requires wavelet coefficients from $A_{00,s}$. For $s \neq L$ these coefficients are not stored explicitly but must be synthesized from a subset of the coefficients contained in the CID file. The request specifies subsets $a_{ij,s}$ for (s,i,j) in K where $K = \{0,0,0\} \cup \{(0,1,l),(1,0,l),(1,1,l) | s < l \leq L\}$.

An overview of browse routine 140 is shown in FIG. 6. Procedure 140 is initiated 142 and begins by reading header information 144 from the CID file that describes the overall structure of this file. The structure information includes the number of levels in the subband decomposition, the image width and height, the supports and coefficient values of the synthesis filters, and an offset table describing the locations of table data and compressed data records. The procedure then invokes subroutine Select View Parameters 146 where the parameters specifying a view request are input. These parameters include the resolution s and the window support $a_{00,s}$.

At this point subroutine Determine Supports 148 is invoked, which evaluates the sets $a_{ij,s}$ specifying the wavelet coefficients that must be synthesized from the CID file. The subsets at level s are related to $a_{00,s-1}$ by the following $x_{ij,s,0} = \left\lceil \frac{x_{00,s-1,0} - l_{i1}}{2} \right\rceil$ $x_{ij,s,1} = \left\lfloor \frac{x_{00,s-1,1} - l_{i0}}{2} \right\rfloor$ $y_{ij,s,0} = \left\lceil \frac{y_{00,s-1,0} - l_{i1}}{2} \right\rceil$ $y_{ij,s,1} = \left\lfloor \frac{y_{00,s-1,1} - l_{i0}}{2} \right\rfloor$ where the support of the synthesis filters is given by
supp$\{h_0\} = [l_{00}, l_{01}]$
supp$\{h_1\} = [l_{10}, l_{11}]$.

Subroutine Determine Supports 148 entails the evaluation of these equations for $s < l < L$.

The cache exists on the client and is composed of a cache memory and a cache table. The cache memory contains data from previous subrequest transmissions from the server. For each entry in cache memory there is a cache table entry describing its support. The support of the I-th cache entry for subband $A_{ij,s}$ is denoted by the cache table entry $e_{ij,s,I}$. After a window request is made, subroutine Cache Query 152 (see FIG. 7) accesses the cache table and generates a description of the requested data that is contained in cache memory. Clearly, during the first call to Cache Query 152 the cache will be empty. The cache data entries will typically be Huffman compressed coefficient indices but may also contain decompressed wavelet coefficients. The cache data entries may exist on primary or secondary memory.

For subband $A_{ij,s}$, zero or more cache entries exist. The support of the cache table entries, denoted by $e_{ij,s,I}$ for $1 \leq I \leq N_{ij,s}$, describe the subset of wavelet coefficients contained in the corresponding cache memory entry. The data from $A_{ij,s}$ that must be obtained from the server is given by $\{(A_{ij,s}(x,y) | (x,y) \in R_{ij,s})\}$ for all $(s,i,j) \in K$, where $R_{ij,s} = a_{ij,s} \cap a_{ij,s} \cap \left( \bigcup_I e_{ij,s,I} \right)$.

This describes the subset of $A_{ij,s}$ required for display that is not present in cache memory. The data that is then transferred from the CID file on the client to the server are the records having support $r_{ij,s,I}$ such that $r_{ij,s,I} \cap R_{ij,s} \neq \emptyset$.

These records may be Huffman subblocks or some subset thereof.

Following Cache Query 152 the client transmits 154 the request and waits for the requested data. The server sends 154 the request in the form of a packet of subrequests, each of which consists of compressed data of a rectangular region from a particular subband. The subrequests are received 156 and subroutine Update Cache 158 stores the subrequests from the data transfer in cache memory, purges the least recently used cache entries, and records each cache hit encountered in Cache Query 152. Subroutine Synthesize Subbands 162 is then invoked to decompress the quantizer indices from the compressed data in the request transfer and reconstructs the wavelet coefficients. The procedure then invokes subroutine DWT Inverse 164, which synthesizes the required subset of $a_{00,s}$.

But DWT Inverse 164 does not calculate the actual pixel values that are used in the window display. This is done by Create Window Pix 166 with the data output by DWT Inverse 164. As an example, the output of DWT Inverse 164 may be in floating point format in which case Create Window Pix 166 casts these values to one-byte words (after a possible rescaling). In another case, the data retrieved may be two-byte words containing, e.g., elevation data. Create Window Pix 166 in this case may generate a shaded relief view of the data. At this step in the browse procedure, if another window is requested 168 the procedure returns 172 to subroutine Select View 146. Otherwise, the program is terminated 174.

The decompression routine discussed above limits the obtainable browse image resolution to a power-of-two times the original image resolution. The generation of arbitrary resolution can be provided by retrieving the closest power-of-two resolution greater than that requested and then performing an interpolation process.

The invention is primarily intended for use in an interactive application. Initially, the user views a low-resolution representation of the image on a computer monitor that provides an icon of a large portion of, or perhaps the entire, image scene. By using a computer pointing device, such as a mouse, the user can interact with the low resolution image to specify a region and length scale (an image view) for display. These parameters are then passed to the decompression routine which retrieves the desired view. This process may be repeated with the user interacting with the original low-resolution scene or with subsequent images returned by the decompression routine. During such repeated applications of the decompression routine, the invention also allows for the management of an image cache to store the results of previous data accesses. By utilizing the image cache, the process described herein needs only to retrieve that data requested by the query that is not in cache memory. The caching scheme is particularly advantageous if the data is being accessed over a data link that is slow compared to the computational time associated with the decompression processing.

It will be understood that the above description and the claim nomenclature is presented in a two-dimensional representation for ease of description and nomenclature. The process is equally applicable to a one-dimensional process and a three-dimensional process. Only the designation of subscripts is different and the use of two-dimensional nomenclature should not be construed as limiting the scope of the claimed invention.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for selectively viewing areas of an image at multiple resolutions in a computer having a primary memory for data processing and a secondary memory for data storage, the method comprising the steps of:

storing a complete set of image data array $I(x,y)$ representing said image in a first secondary memory of said computer;

defining a plurality of discrete tile image data $T_{ij}(x,y)$ subsets, where said complete set of image data $I(x,y)$ is formed by superposition of said discrete tile image data $T_{ij}(x,y)$;

performing one or more discrete wavelet transformation (DWT)-based compression processes on each said tile image data $T_{ij}(x,y)$ in a selected sequence to output each said discrete tile image data $T_{ij}(x,y)$ as a succession of DWT coefficients in a succession of subband sets, where one subband of each set is a low-resolution representation of said discrete tile image data $T_{ij}(x,y)$ to form a sequence of low-resolution representations of said image data array $I(x,y)$ to selected resolutions;

maintaining updated sums of said DWT coefficients from said discrete tile image $T_{ij}(x,y)$ to form a seamless DWT of said image and storing said sums in a first primary memory location of said computer;

periodically compressing said sums and transferring said compressed sums to a second secondary memory to maintain sufficient memory in said primary memory for data processing, wherein said second secondary memory contains stored DWT wavelet coefficients;

selecting a viewing set of said image data array $I(x,y)$ to be viewed at a desired resolution;

determining a viewing subset of said stored DWT wavelet coefficients that support said viewing set of said image data at said desired resolution; and forming from said subset of said stored DWT wavelet coefficients a computer display of said viewing set of said image data at said desired resolution.

2. A method according to claim 1, wherein the step of performing one or more DWT of each said tile image data includes the step of setting all image data value to zero outside said tile image data to form a tile data array that is supported only over said tile image data subset $T_{ij}(x,y)$ and performing said DWT over said entire tile data array.

3. A method according to claim 1, where said selected sequence for performing said DWT compression on said tile image data $T_{ij}(x,y)$ is to compress tile image data $T_{i-1,j}(x,y)$ and $T_{i,j-1}(x,y)$ before compressing $T_{ij}(x,y)$.

4. A method according to claim 2, where said selected sequence for performing said DWT compression on said tile image data $T_{ij}(x,y)$ is to compress tile image data $T_{i-1,j}(x,y)$ and $T_{i,j-1}(x,y)$ before compressing $T_{ij}(x,y)$.

5. A method according to claim 1, wherein the step of maintaining updated sums of said DWT coefficients includes the step of retrieving updated sums of DWT coefficients for $T_{i-1,j}(x,y)$ and $T_{i,j-1}(x,y)$ and adding to coefficients for $T_{ij}(x,y)$.

6. A method according to claim 2, wherein the step of maintaining updated sums of said DWT coefficients includes the step of retrieving updated sums of DWT coefficients for $T_{i-1,j}(x,y)$ and $T_{i,j-1}(x,y)$ and adding to coefficients for $T_{ij}(x,y)$.

7. A method according to claim 3, wherein the step of maintaining updated sums of said DWT coefficients includes the step of retrieving updated sums of DWT coefficients for $T_{i-1,j}(x,y)$ and $T_{i,j-1}(x,y)$ and adding to coefficients for $T_{ij}(x,y)$.

8. A method according to claim 4, wherein the step of maintaining updated sums of said DWT coefficients includes the step of retrieving updated sums of DWT coefficients for $T_{i-1,j}(x,y)$ and $T_{i,j-1}(x,y)$ and adding to coefficients for $T_{ij}(x,y)$.

9. A method according to claim 1, wherein the step of selecting a viewing set of said image data $I(x,y)$ to be viewed at a selected resolution comprises the steps of specifying a set of coordinates $(x,y)$ from said image data array $I(x,y)$ and reading related stored information that includes the number of resolution levels for said subband sets, image width and height, supports and coefficient values for synthesis filters, and an offset table describing the locations of table data and compressed data records.

10. A method according to claim 1, wherein the step of selecting a viewing subset of said stored DWT wavelet coefficients includes the step of extracting wavelet coefficients corresponding to said viewing set and the corresponding synthesis filters for decompressing said wavelet coefficients.

11. A method according to claim 1, further including the step of establishing a cache memory for storing decompressed wavelet coefficients for each said computer display that is formed.

12. A method according to claim 11, wherein the step of selecting a viewing subset of said stored DWT wavelet coefficients includes a first step of determining whether said coefficients are stored in said cache memory.

13. A method for compressing a large digital image for storage in a computer memory, the method comprising the steps of:

storing a complete set of image data array $I(x,y)$ representing said image in a first memory location of said computer;

defining a plurality of discrete tile image data $T_{ij}(x,y)$ subsets of said $I(x,y)$, where $I(x,y)$ is formed by superposition of said $T_{ij}(x,y)$;

performing on a computer one or more discrete wavelet transformation (DWT)-based compression processes over each said tile image data $T_{ij}(x,y)$ in a selected sequence to output each said $T_{ij}(x,y)$ as a succession of DWT coefficients in a succession of subband sets, where one subband of each set is a low-resolution representation of said $T_{ij}(x,y)$ to form a sequence of low-resolution representations of said $I(x,y)$ to selected resolutions; and maintaining updated sums of said DWT coefficients from said discrete tile image $T_{ij}(x,y)$ to form a seamless DWT of said $I(x,y)$ and storing said sums in a second memory location of said computer.

14. A method according to claim 13, further including the step of:

periodically compressing said sums and transferring said compressed sums to a second secondary memory to maintain sufficient memory in said primary memory for data processing.

15. A method according to claim 13, wherein the step of performing one or more DWT of each said tile image data includes the step of setting all image data value to zero outside said tile image data to form a tile data array that is supported only over said tile image data subset $T_{ij}(x,y)$ and performing said DWT over said entire tile data array.

16. A method according to claim 13, where said selected sequence for performing said DWT compression on said tile image data $T_{ij}(x,y)$ is to compress tile image data $T_{i-1,j}(x,y)$ and $T_{i,j-1}(x,y)$ before compressing $T_{ij}(x,y)$.

17. A method according to claim 15, where said selected sequence for performing said DWT compression on said tile image data $T_{ij}(x,y)$ is to compress tile image data $T_{i-1,j}(x,y)$ and $T_{i,j-1}(x,y)$ before compressing $T_{ij}(x,y)$.

18. A method according to claim 13, wherein the step of maintaining updated sums of said DWT coefficients includes the step of retrieving updated sums of DWT coefficients for $T_{i-1,j}(x,y)$ and $T_{i,j-1}(x,y)$ and adding to coefficients for $T_{ij}(x,y)$.

19. A method according to claim 14, wherein the step of maintaining updated sums of said DWT coefficients includes the step of retrieving updated sums of DWT coefficients for $T_{i-1,j}((x,y)$ and $T_{i,j-1}(x,y)$ and adding to coefficients for $T_{ij}(x,y)$.

20. A method according to claim 15, wherein the step of maintaining updated sums of said DWT coefficients includes the step of retrieving updated sums of DWT coefficients for $T_{i-1,j}(x,y)$ and $T_{i,j-1}(x,y)$ and adding to coefficients for $T_{ij}(x,y)$.

21. A method for selectively viewing areas of an image at multiple resolutions in a computer having a primary memory for data processing and a secondary memory for data storage, the method comprising the steps of:

storing a complete set of image data array $I(x,y)$ representing said image in a first secondary memory of said computer;

defining a plurality of discrete tile image data $T_{ij}(x,y)$ subsets, where said complete set of image data $I(x,y)$ is formed by superposition of said discrete tile image data $T_{ij}(x,y)$;

performing one or more discrete wavelet transformation (DWT)-based compression processes on each said tile image data $T_{ij}(x,y)$ in a selected sequence to output each said discrete tile image data $T_{ij}(x,y)$ as a succession of DWT coefficients in a succession of subband sets, where one subband of each set is a low-resolution representation of said discrete tile image data $T_{ij}(x,y)$ to form a sequence of low-resolution representations of said image data array $I(x,y)$ to selected resolutions;

selecting a viewing set of said image data array $I(x,y)$ to be viewed at a desired resolution:

determining a viewing subset of said DWT wavelet coefficients that support said viewing set of said image data at said desired resolution; and forming from said subset of said DWT wavelet coefficients a computer display of said viewing set of said image data at said desired resolution.

22. A method according to claim 21, wherein the step of performing one or more DWT of each said tile image data includes the step of setting all image data value to zero outside said tile image data to form a tile data array that is supported only over said tile image data subset $T_{ij}(x,y)$ and performing said DWT over said entire tile data array.

23. A method according to claim 21, where said selected sequence for performing said DWT compression on said tile image data $T_{ij}(x,y)$ is to compress tile image data $T_{i-1,j}(x,y)$ and $T_{i,j-1}(x,y)$ before compressing $T_{ij}(x,y)$.

24. A method according to claim 22, where said selected sequence for performing said DWT compression on said tile image data $T_{ij}(x,y)$ is to compress tile image data $T_{i-1,j}(x,y)$ and $T_{i,j-1}(x,y)$ before compressing $T_{ij}(x,y)$.

25. A method according to claim 21, wherein the step of selecting a viewing set of said image data $I(x,y)$ to be viewed at a selected resolution comprises the steps of specifying a set of coordinates $(x,y)$ from said image data array $I(x,y)$ and reading related stored information that includes the number of resolution levels for said subband sets, image width and height, supports and coefficient values for synthesis filters, and an offset table describing the locations of table data and compressed data records.

26. A method according to claim 1, wherein the step of selecting a viewing subset of said DWT wavelet coefficients includes the step of extracting wavelet coefficients corresponding to said viewing set and the corresponding synthesis filters for decompressing said wavelet coefficients.

27. A method according to claim 21, further including the step of establishing a cache memory for storing decompressed wavelet coefficients for each said computer display that is formed.

28. A method according to claim 27, wherein the step of selecting a viewing subset of said DWT wavelet coefficients includes a first step of determining whether said coefficients are stored in said cache memory.

* * * * *